(12) United States Patent
Horn et al.

(10) Patent No.: US 11,424,804 B2
(45) Date of Patent: Aug. 23, 2022

(54) UE CAPABILITY SPACE FREQUENCY MULTI TRP USER EQUIPMENT PEAK TO AVERAGE POWER RATIO REDUCTION

(71) Applicant: QUALCOMM Incorporated, San Diego, CA (US)

(72) Inventors: Idan Michael Horn, Hod Hasharon (IL); Shay Landis, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/105,354

(22) Filed: Nov. 25, 2020

(65) Prior Publication Data

US 2022/0166481 A1 May 26, 2022

(51) Int. Cl.
| | |
|---|---|
| *H04L 1/00* | (2006.01) |
| *H04B 7/06* | (2006.01) |
| *H04W 72/04* | (2009.01) |
| *H04W 24/10* | (2009.01) |
| *H04B 1/00* | (2006.01) |
| *H04B 1/7107* | (2011.01) |

(52) U.S. Cl.
CPC ......... *H04B 7/0628* (2013.01); *H04B 1/0017* (2013.01); *H04B 1/7107* (2013.01); *H04W 24/10* (2013.01); *H04W 72/042* (2013.01); *H04W 72/048* (2013.01); *H04L 1/0071* (2013.01)

(58) Field of Classification Search
CPC . H04L 5/0048; H04L 5/0053; H04L 27/2614; H04L 5/0094; H04L 5/0007; H04L 5/0051; H04L 27/2618; H04L 5/0055; H04L 1/1896; H04L 27/2623; H04L 5/0023; H04L 5/001; H04L 1/0071; H04L 1/0041; H04L 27/2602; H04L 27/2613; H04L 1/0057; H04L 27/2627; H04W 72/0453; H04W 72/0446; H04W 72/042; H04W 72/0406; H04W 72/1289; H04W 72/0413; H04W 72/02; H04W 72/04; H04W 72/1263; H04W 92/18; H04W 56/001; H04W 72/10; H04B 7/0695; H04B 7/088; H04B 7/0413; H04B 1/0475; H04B 7/0404; H04B 7/0456; H04B 7/0486; H04B 7/0682; H04B 7/18513; H04B 7/18519; H04B 7/18539; H04B 7/18563
USPC ........................................................ 370/329
See application file for complete search history.

(56) References Cited

U.S. PATENT DOCUMENTS

| | | | | |
|---|---|---|---|---|
| 10,951,296 | B1* | 3/2021 | Li | H04B 7/0417 |
| 2015/0200797 | A1* | 7/2015 | McCallister | H04L 27/2623 370/329 |
| 2021/0266209 | A1* | 8/2021 | Zach | H04L 27/2614 |
| 2021/0328847 | A1* | 10/2021 | Zach | H04B 7/0617 |

* cited by examiner

*Primary Examiner* — Eva Y Puente
(74) *Attorney, Agent, or Firm* — Procopio, Cory, Hargreaves & Savitch LLP

(57) ABSTRACT

A configuration to reduce a UE PAPR due to a transmission of a PAPR reduction signal into a UE null space. The apparatus establishes a connection with a base station. The apparatus transmits, to the base station, an SFMT report including an indication of a capability of the UE to process a signal form the base station that includes an SFMT transmission. The apparatus receives, from the base station, a downlink PAPR reduction signal based on the SFMT report of the UE.

28 Claims, 9 Drawing Sheets

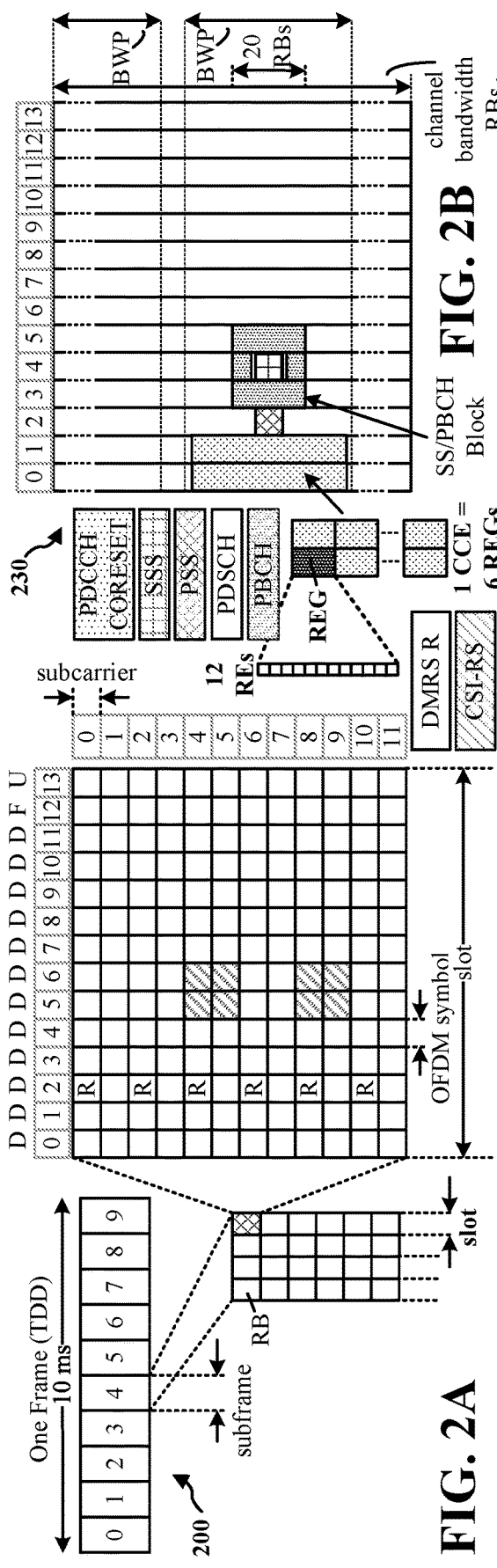
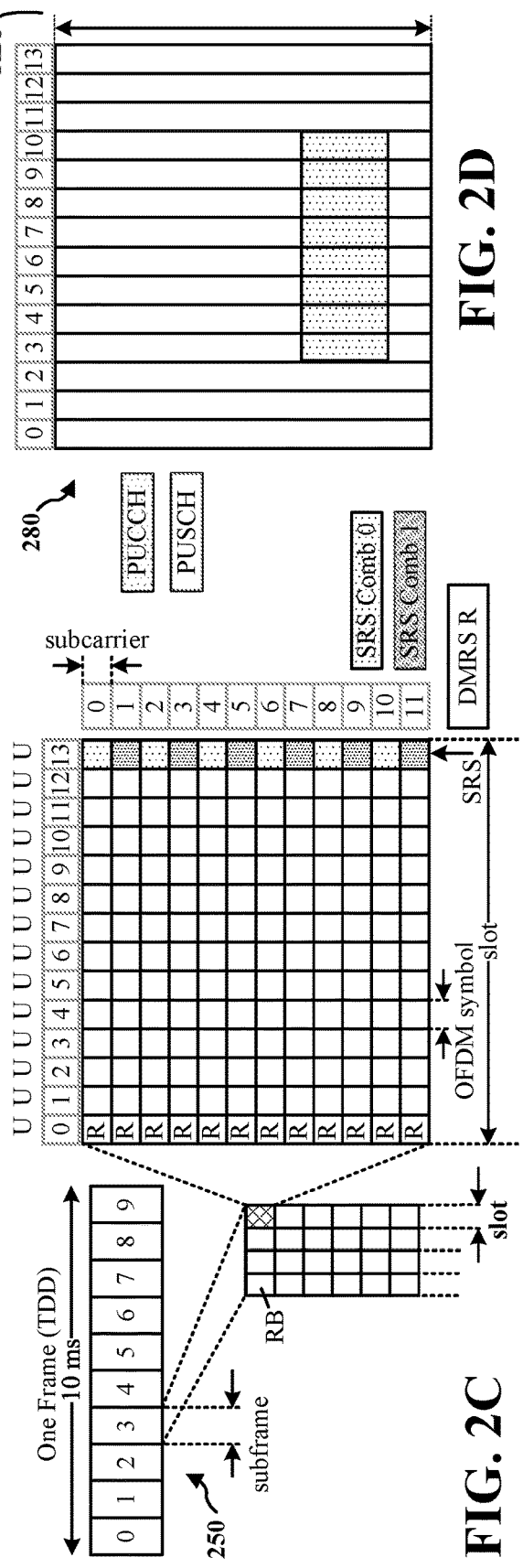
FIG. 2A
FIG. 2B
FIG. 2C
FIG. 2D

UE CAPABILITY SPACE FREQUENCY MULTI TRP USER EQUIPMENT PEAK TO AVERAGE POWER RATIO REDUCTION

BACKGROUND

Technical Field

The present disclosure relates generally to communication systems, and more particularly, to a configuration to reduce a user equipment (UE) peak to average power ratio (PAPR) due to a transmission of a PAPR reduction signal into a UE null space.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus establishes a connection with a base station. The apparatus transmits, to the base station, a space frequency multiple transmission reception point (SFMT) report including an indication of a capability of the UE to process a signal from the base station that includes an SFMT transmission. The apparatus receives, from the base station, a downlink peak to average power ratio (PAPR) reduction signal based on the SFMT report of the UE.

In an aspect of the disclosure, a method, a computer-readable medium, and an apparatus are provided. The apparatus may be a device at a base station. The device may be a processor and/or a modem at a base station or the base station itself. The apparatus receives, from a UE, a request to establish a connection. The apparatus receives, from the UE, a space frequency multiple transmission reception point (SFMT) report including an indication of a capability of the UE to process a signal from the base station that includes an SFMT transmission. The apparatus transmitting, to the UE, a downlink PAPR reduction signal based on the SFMT report of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
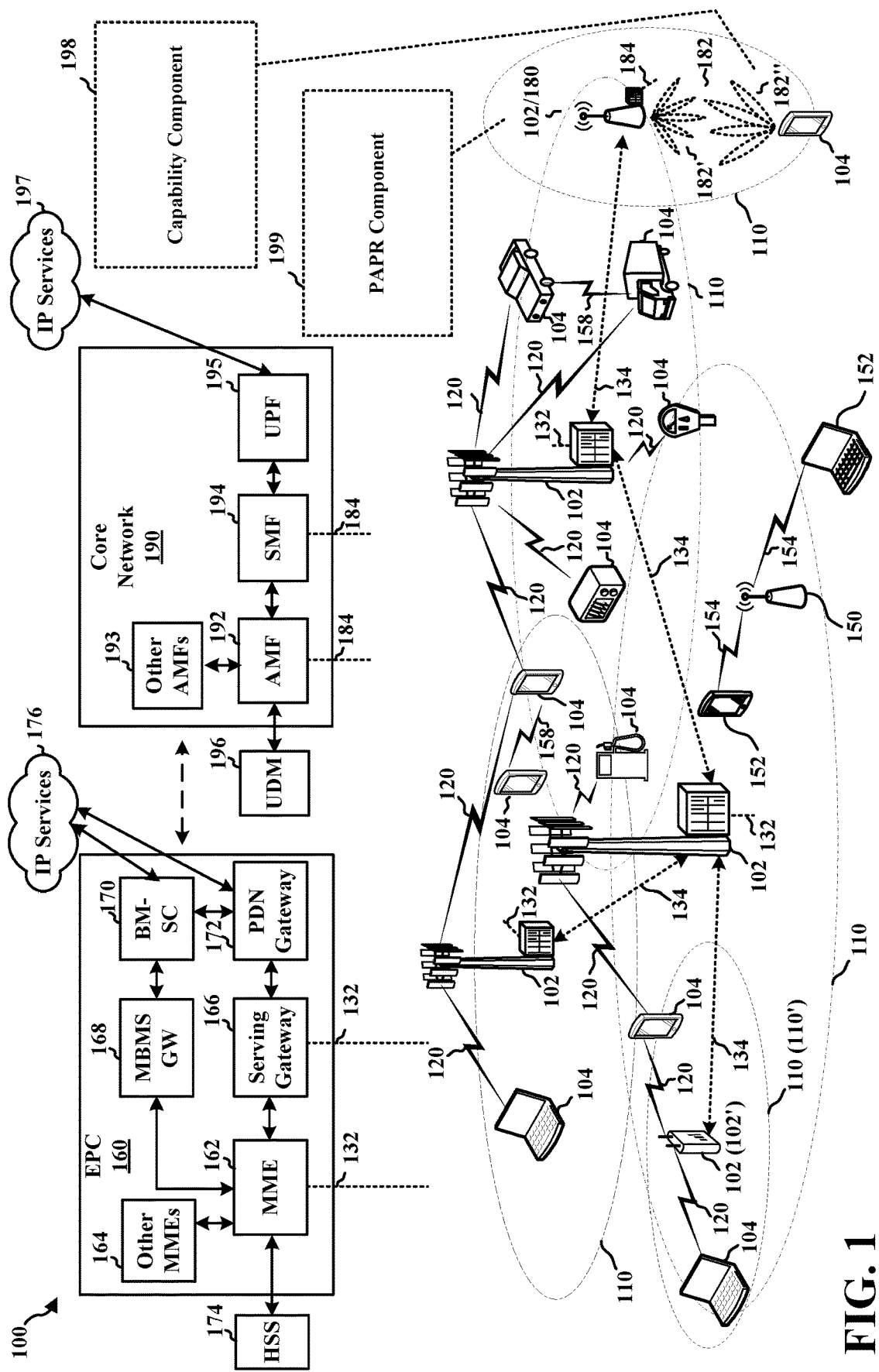
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide an indication of a capability to process a signal from a base station 180 that includes an SFMT transmission in order to receive a PAPR reduction signal. For example, the UE 104 of FIG. 1 may include a capability component 198 configured to provide an indication of a capability to process the signal from the base station 180 that includes the SFMT transmission. The UE 104 may establish a connection with a base station 180. The UE 104 may transmit, to the base station 180, an SFMT report including an indication of a capability of the UE to process a signal from the base station 180 that includes an SFMT transmission. The UE 104 may receive, from the base station 180, a downlink PAPR reduction signal based on the SFMT report of the UE.

Referring again to FIG. 1, in certain aspects, the base station 180 may be configured to reduce a UE PAPR due to a transmission of a PAPR reduction signal into a UE null space. For example, the base station 180 of FIG. 1 may include a PAPR component 199 configured to reduce a UE PAPR due to a transmission of a PAPR reduction signal into a UE null space. The base station 180 may receive, from a UE 104, a request to establish a connection. The base station 180 may receive, from the UE 104, an SFMT report including an indication of a capability of the UE to process a signal from the base station 180 that includes an SFMT transmission. The base station 180 may transmit, to the UE 180, a downlink PAPR reduction signal based on the SFMT report of the UE.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
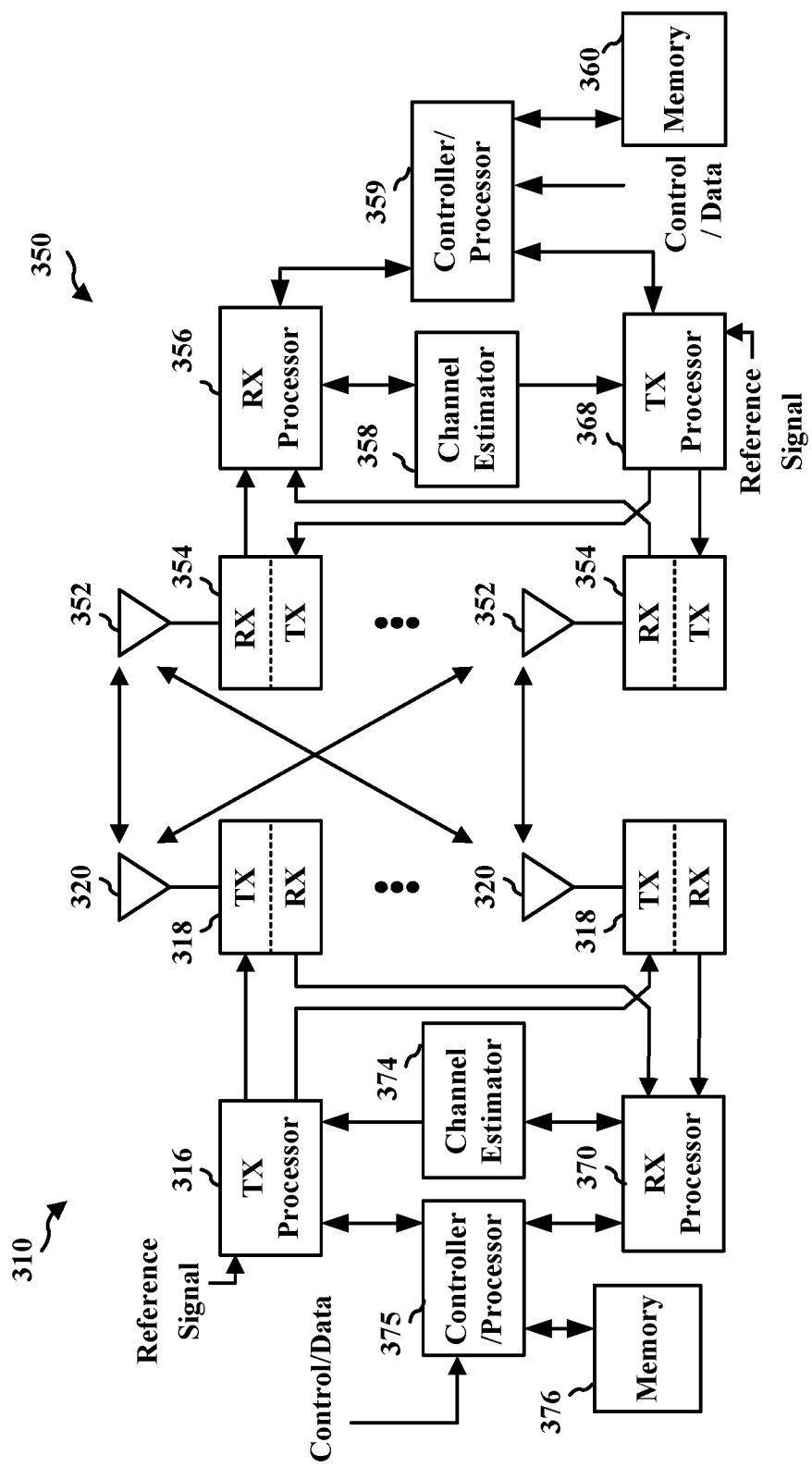
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems (e.g., including 5G NR wireless communication systems and other wireless communication systems), reducing the power consumption of the UE may be challenging. This challenge may become more prominent with the growth in bandwidths, such as expanding to bandwidths including frequency range (FR) 4, FR5, 6G, etc. Supporting higher bandwidth signals and increased data rates may result in an increase of power consumption at the UE.

As wireless communication systems progress to higher frequency bands, such as but not limited to sub-THz, the antenna dimensions may decrease due to the antenna size being relative to the wavelength. With the decreased size of individual antennas, a UE may include an increased number of antennas in the same size antenna array. An increase of the number of antenna elements may result in an improved spectral efficiency due to an increased array gain and a reduction of interference. For example, the increased number of antenna elements may enable the UE to transmit and receiving using a narrower beam width that may result in an increased spatial separation between beams.

Power consumption may include the power consumed by the antenna elements, but may also include processing of analog to digital converters (ADC), digital front end (DFE), and baseband processing. The usage of lower resolution ADCs may assist in reducing the power consumption by the ADCs, as well as by the DFEs due to the DFEs processing a baseband signal having a lower bit width. The number of bits utilized for operation of an ADC may be based on several factors, such as but not limited to PAPR, working signal to noise ratio (SNR), channel fading, automatic gain control (AGC) uncertainty.

Aspects presented herein enable a reduction in the PAPR of a downlink signal at the UE. The reduced PAPR may enable the UE to use a lower resolution ADC processing, which may reduce power consumption at the UE. For example, the capability to reduce the downlink signal PAPR may reduce the number of bits for the UE ADC.

Figures 4A, 4B:
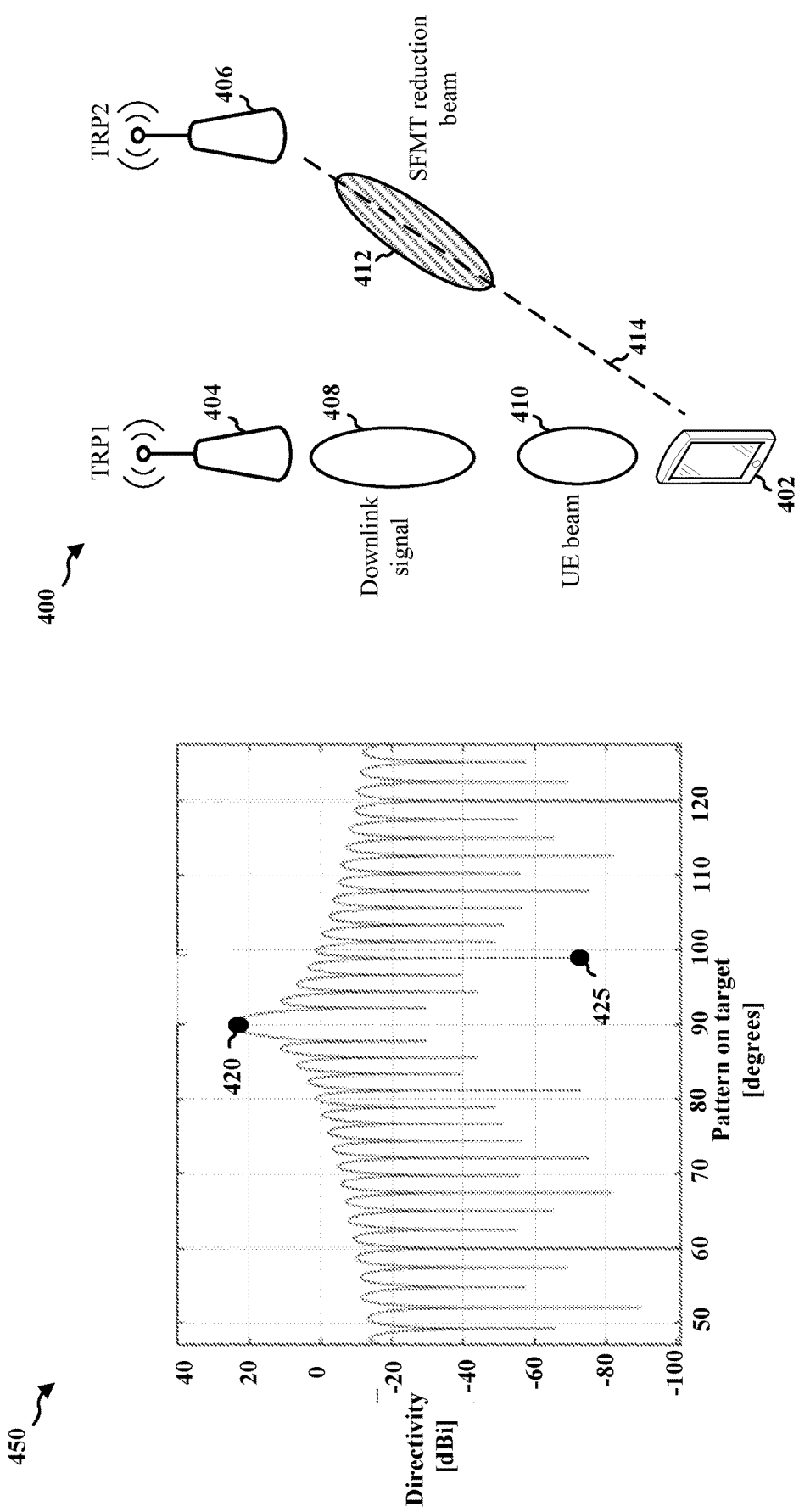
FIG. 4A is a diagram illustrating an example of a signal received from a null space angle in a wireless communication system.
FIG. 4B is a graph illustrating an example of a UE pattern including null spaces.

The base station may help to reduce the UE PAPR by transmitting a PAPR reduction signal into the UE null space. FIG. 4B illustrates a graph 450 showing an example UE pattern showing null spaces at different angles of arrival for the UE. Point 420 illustrates a direction, or space, in which the UE receives a signal. Point 425 illustrates an example null space, e.g., a space between directional beams, where the UE does not receive a signal or received a reduced amount of the signal compared to point 420. The UE may have one or more null spaces, where the directions associated with the one or more null spaces may represent a vector of weights that spans the null space. The spatial direction corresponding to point 425, and the other angles having reduced reception, may be referred to as a null space for the UE. The effect of an increased number of antennas is the increase in a null space rank, e.g., the number of null spaces, which linearly increase with the increase in the number of antennas. The null space may be viewed intuitively as the angle of arrival that may be nulled due to UE beamforming. For example, a signal transmitted from a null angle of arrival will be faded.

FIG. 4A illustrates a diagram 400 that includes a UE 402, a first transmission reception point (TRP) TRP1 404 and a second TRP TRP2 406 transmitting an SFMT signal 412 in a null space of the UE 402. TRP1 404 may transmit a downlink signal 408 to the UE 402, while the UE 402 utilizes a UE receive beam 410 to receive the downlink signal 408 from the TRP1 404. TRP2 406 may transmit an SFMT signal 412 in a direction 414 towards the null space of the UE 402, such that the SFMT signal 412 does not cause interference with the UE 402. The angle of arrival of the SFMT signal 412 along the direction 414 may be nulled due to the beamforming at the UE 402, such that the SFMT signal 412 will be faded along the direction 414. TRP2 406 may transmit a signal to a different UE that would arrive at the UE in the null space at point 425 as a way of reducing the PAPR of the UE. The number of null spaces at the UE may be based on the number of antennas at the UE. An increase in the number of antennas may correspond to an increase in a null space rank. The rank of a null space may be based on the number of antennas and the number of layers after beamforming. For example, the rank of the null space may be determined by the number of antennas minus the number of layers after the beamforming.

In some instances, the space frequency multi TRP (SFMT) approach may use a high rank of the null space to transmit, to the UE, a PAPR reduction signal in a null space of the UE, which may reduce the UE's power consumption. Aspects presented herein provide new base station and UE capabilities for the transmission/reception of the PAPR reduction signal in the UE null space. The aspects presented herein allow the UE to use a lower resolution ADC based on the PAPR reduction. The lower resolution ADC reduces power consumption at the UE, e.g., for mmW communication, sub-THz communication, etc. The PAPR reduction signal, or SFMT signal in the null space of the UE may not provide a bit error rate (BER) loss, because the PAPR reduction signal is received in the null space of the UE. Thus, after beamforming, the PAPR reduction signal will fade in reception at the UE, e.g., the UE will not detect or see the PAPR reduction signal.

The SFMT approach may be applied to reduce the PAPR at each UE antenna without changing the BER, e.g., $$\underset{\delta a}{\operatorname{argmin}} PAPR(a + \delta a)$$

with a constraint to avoid a BER increase. In the equation, "a" represents a signal, and $\delta a$ represents another downlink signal that affects the signal a to reduce, or optimize, PAPR at the UE. The additional signal may be transmitted in the null space of the downlink beamforming. For example, the equation $H_{RxXTx}^{SFMT} W_{TxXRx}^{SFMT} \perp W_{DigLayXRx}^{Rx}$ indicates that the SFMT channel $H_{RxXTx}^{SFMT}$ having a weight $W_{TxXRx}^{SFMT}$ is in the null space of the UE signal beamforming $W_{DigLayXRx}^{Rx}$ for reception of the downlink communication signal from the base station. The equation indicates that the SFMT signal is in the null space and orthogonal to the downlink beamforming.

The position of the SFMT in the null space of the UE may be achieved as shown by the equation:

$$H_{RxXTx}^{SFMT} W_{TxXRx}^{SFMT} = (I_{RxXRx} - W_{DigLayXRx}^{Rx} {}^{H}(W_{DigLayXRx}^{Rx} W_{DigLayXRx}^{Rx\ H})^{-1} W_{DigLayXRx}^{Rx}$$

In the equation, the SFMT signal is represented by $H_{RxXTx}^{SFMT} W_{TxXRx}^{SFMT}$ and $W_{DigLayXRx}^{Rx\ H}$ is the hermetic conjugate of $W_{DigLayXRx}^{Rx}$, and $I_{RxXRx}$ is the identity matrix of size Rx×Rx, where Rx represents the number of antennas at the UE side. The equation shows that the SMFT signal will be a null signal at the UE based on the beamforming. In some aspects, the SFMT number of antennas may be equal to the UE number of antennas so that $H_{RxXTx}^{SFMU} = I_{RxXTx}$. Then, $$W_{RxXRx}^{SFMT} = (I_{RxXRx} - W_{DigLayXRx}^{Rx} {}^{H}(W_{DigLayXRx}^{Rx} W_{DigLayXRx}^{Rx\ H})^{-1} W_{DigLayXRx}^{Rx},$$

where $W_{RxXRx}^{SFMT}$ corresponds to precoding of the SFMT signal and $W_{DigLayXRx}^{Rx}$ corresponds to a precoding applied by the UE.

The received signal at each antenna, e.g., before LNA, will be:

$$z_{RxX1} = H_{RxXTx} W_{TxXLay}^{Tx} x_{LayX1} + H_{RxXTx}^{SFMT} W_{TxXRx}^{SFMT} x_{RxX1}^{SFMT}$$

In this equation, $z_{RxX1}$ represents the received signal at the UE antennas before LNA, $H_{RxXTx}$ represents the downlink signal channel, $W_{TxXLay}^{Tx}$ represents the downlink signal precoding, $x_{LayX1}$ represents the downlink data signal, $H_{RxXTx}^{SFMT}$ represents the PAPR reduction signal channel, $W_{TxXRx}^{SFMT}$ represents the PAPR reduction signal precoding, and $x_{RxX1}^{SFMT}$ represents the PAPR reduction signal, which is not data but a signal used for PAPR reduction. $H_{RxXTx}^{SFMT} W_{TxXRx}^{SFMT} x_{RxX1}^{SFMT}$ represents the SFMT signal, with $x_{RxX1}^{SFMT}$ to be defined.

After beamforming, the signal becomes: $y_{DigLayX1} = W_{DigLayXRx}^{Rx} H_{RxXTx} W_{TxXTxLay}^{Tx} x_{LayX1} + W_{DigLayXRx}^{Rx} H_{RxXTx}^{SFMT} x_{RxX1}^{SFMT} + W_{DigLayXRx}^{Rx} n_{RxX1}$, where $y_{DigLayX1}$ represents the received signal after applying UE beamforming. Based on the orthogonal definition, the SFMT signal corrects to zero, e.g., with $W_{DigLayXRx}^{Rx} H_{RxXTx}^{SFMT} W_{TxXRx}^{SFMT} x_{RxX1}^{SFMT} = 0$. SFMT does not change the BER for the UE. The signal becomes $y_{DigLayX1} = W_{DigLayXRx}^{Rx} H_{RxXTx} W_{TxXTxLay}^{Tx} x_{LayX1} + W_{DigLayXRx}^{Rx} n_{RxX1}$, where $W_{DigLayXRx}^{Rx} n_{RxX1}$ is the original noise for the downlink signal and is not due to the SFMT signal. The base station may use an algorithm to determine $x_{RxX1}^{SFMT}$. The base station may perform the algorithm in an iterative manner. The base station may calculate $z_{RxX1} = H_{RxXTx} W_{TxXTxLay}^{Tx} x_{LayX1}$. The base station may set $z_{RxX1}^{next} = z_{RxX1}$, e.g., initiated based on the downlink signal for the UE.

For example, the base station may determine the time domain signal that the base station expects the UE to receive as $a_{RxX1} = \text{ifft}\{z_{RxX1}^{next}\}$. The base station may clip the signal to generate $\hat{a}_{RxX1} = \text{clip}\{a_{RxX1}\}$. Then, the base station may determine $\hat{z}_{RxX1} = \text{fft}\{\hat{a}_{RxX1}\}$ based on the clipped signal. The signal $\hat{z}_{RxX1}$ is similar to the signal $z_{RxX1}$, with the inclusion of the clipping distortion. The base station may then calculate $z_{RxX1}^{next}$ based on $z_{RxX1}^{next} = z_{RxX1} + (I_{RxXRx} - W_{DigLayXRx}^{Rx}{}^{H}(W_{DigLayXRx}^{Rx} W_{DigLayXRx}^{Rx\ H})^{-1} W_{DigLayXRx}^{Rx}) (\hat{z}_{RxX1} - z_{RxX1})$. In some instances, the base station may calculate $z_{RxX1}^{next(i+1)}$ based on $z_{RxX1}^{next(i+1)} = z_{RxX1}^{next(i)} + (I_{RxXRx} - W_{DigLayXRx}^{Rx}{}^{H}(W_{DigLayXRx}^{Rx} W_{DigLayXRx}^{Rx\ H})^{-1} W_{DigLayXRx}^{Rx}) (\hat{z}_{RxX1} - z_{RxX1}^{next(i)})$. And may apply the determined $z_{RxX1}^{next}$ in the determination of $a_{RxX1}$ and repeat the calculations. The base station may iteratively repeat the calculations using the newly determined $z_{RxX1}^{next}$ each iteration. The base station may perform the iterations up to a particular number of iterations, e.g., a defined number, a default number, etc. Alternatively, the base station may perform the iterations until a PAPR threshold is achieved. The UE may report the null space to the base station, and the base station may perform the calculations in order to determine the SFMT signal to transmit in the null space of the UE.

The base station may use the SFMT determinations to transmit a signal in the null space that helps to reduce the PAPR at the UE. The base station may inform the UE so that the UE may reduce the resolution of the ADC in order to increase power savings at the UE. The calculations presented herein are merely to illustrate the concept of the use of the SFMT signal for PAPR reduction, and the PAPR reduction signal may be determined in other manners, as well.

Figure 5:
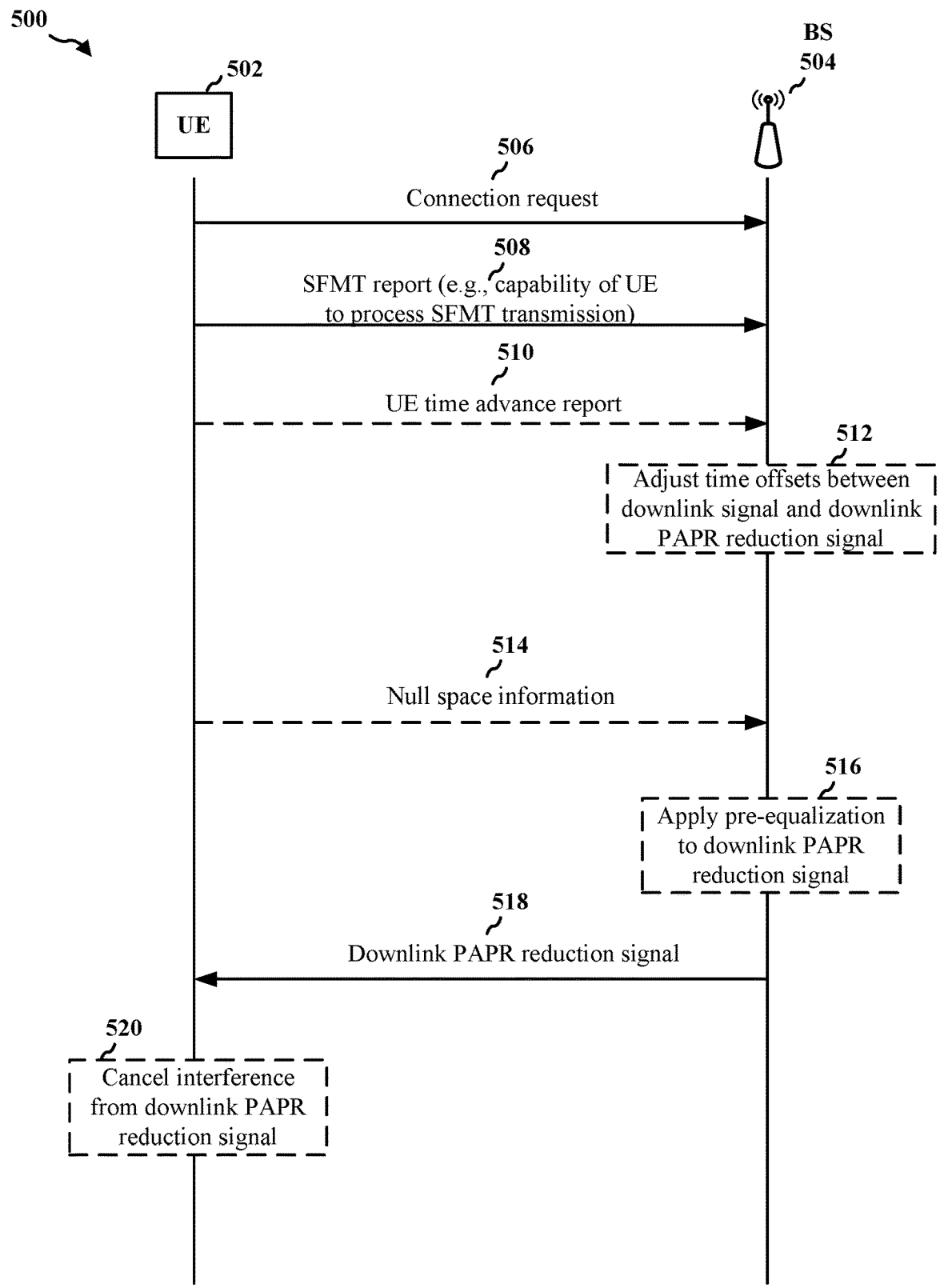
FIG. 5 is a call flow diagram of signaling between a UE and a base station in accordance with certain aspects of the disclosure.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

As illustrated at 506, the UE 502 may establish a connection with a base station. The UE 502 may establish the connection with the base station by transmitting a connection request to the base station. The base station 504 may receive the request to establish the connection from the UE 502.

As illustrated at 508, the UE 502 may transmit an SFMT report including an indication of a capability of the UE 502 to process a PAPR SFMT signal. The UE 502 may transmit the SFMT report including the indication of the capability of the UE 502 to process the PAPR SFMT signal to the base station 504. The base station 504 may receive the SFMT report including the indication of the capability of the UE to process the PAPR SFMT signal from the UE 502. In some aspects, the indication may indicate that the UE 502 may be capable of utilizing a lower resolution analog to digital converter (ADC). The UE 502 may be configured to utilize a dynamic number of ADC bits which may allow the UE 502 to utilize the lower resolution ADC. In some aspects, the capability may be based on the UE 502 utilizing the dynamic number of ADC bits. In some aspects, the capability may be based on the UE 502 utilizing a digital beamforming structure. In some aspects, the SFMT report may include information related to a downlink signal. For example, the SFMT report may include the downlink channel. In some aspects, the SFMT report may include information for the downlink signal and the downlink PAPR reduction signal.

In some aspects, for example as illustrated at 510, the UE 502 may transmit a UE time advance report. The UE may transmit the UE time advance report to the base station 504. The base station 504 may receive the UE time advance report from the UE 502. The UE time advance report may enable the base station 504 to adjust time offsets between a downlink signal and a downlink PAPR reduction signal. In some aspects, the downlink signal may be the downlink signal received by the UE 502 during the connection establishment procedure with the base station. In some aspects, the UE time advance report may be transmitted via radio resource control (RRC) messaging, medium access control—control element (MAC-CE), or a channel state information (CSI) report.

In some aspects, for example as illustrated at 512, the base station 504 may adjust time offsets between a downlink signal and a downlink PAPR reduction signal. The base station 504 may adjust time offsets between the downlink signal and the downlink PAPR reduction signal based on the UE time advance report.

In some aspects, for example as illustrated at 514, the UE 502 may transmit null space information. The UE 502 may transmit the null space information to the base station 504. The base station 504 may receive the null space information from the UE 502. The null space information may include information about one or more null spaces of the UE 502. The base station 504 may utilize the null space information of the UE to determine a downlink transmission beam of the base station 504 in preparation of transmitting a downlink PAPR reduction signal to the UE.

In some aspects, the base station 504 may receive sounding reference signals (SRS) from the UE 502. The base station 504 may determine information about the downlink channel from the SRS. For example, the base station may determine the downlink channel from the SRS transmitted from the UE, assuming reciprocity. The base station 504 may be configured to generate a PAPR reduction signal based on the information about the downlink channel within the SRS. In some aspects, the SFMT report may include information on the downlink signal and the downlink PAPR reduction signal.

In some aspects, for example as illustrated at 516, the base station 504 may apply a pre-equalization to the downlink PAPR reduction signal. For example, the pre-equalization may include a deconvolution with the channel or convolve with the inverse of the channel $H^{-1}$. The base station may apply the pre-equalization to the downlink PAPR reduction signal to reduce a channel fading margin, which may allow the UE 502 to reduce the amount of ADC bits used by the UE 502 to receive the downlink PAPR reduction signal. For example, the pre-equalization to the downlink PAPR reduction signal to reduce the channel fading margin may include a deconvolution with the SFMT channel or convolve with the inverse of the SFMT channel.

As illustrated at 518, the base station 504 may transmit the downlink PAPR reduction signal. The base station 504 may transmit the downlink PAPR reduction signal to the UE 502. The UE 502 may receive the downlink PAPR reduction signal from the base station 504. The downlink PAPR reduction signal may be based on the SFMT report of the UE. In some aspects, the transmitting of the downlink PAPR reduction signal may comprise transmitting the downlink PAPR reduction signal in at least one null space of the UE 502. In some aspects, the base station 504 may be configured to reduce the PAPR in the downlink PAPR reduction signal based on a modulation and coding scheme (MCS) utilized in the downlink signal. For example, distortion may be added to the SFMT signal such that the SFMT signal may degrade the received EVM. A desired EVM, at the UE side, may be defined bases on the MCS utilized in the downlink signal. For example, 64 QAM may require an EVM such as above 30 dB (e.g., low distortion) as compared to QPSK, which may have an EVM of around 20 dB, which may result in a stronger distortion and may assist to further reduce the PAPR. In some aspects, the base station 504 transmitting the downlink PAPR reduction signal may comprise transmitting the downlink PAPR reduction signal in the downlink space. In some aspects, the base station 504 may be configured to cancel interference from the downlink PAPR reduction signal in a downlink space due to transmitting the downlink PAPR reduction signal within the nulls space and within the downlink signal space which may create interference that can be estimated and controlled.

In some aspects, for example as illustrated at 520, the UE 502 may cancel interference from the downlink PAPR reduction signal in a downlink signal space. In some aspects, the receiving of the downlink PAPR reduction signal may comprise receiving the downlink PAPR reduction signal in the downlink signal space. In some aspects, the UE may cancel interference based on utilizing UE beamforming optimized for the downlink signal direction of the downlink PAPR reduction signal.

Figure 6:
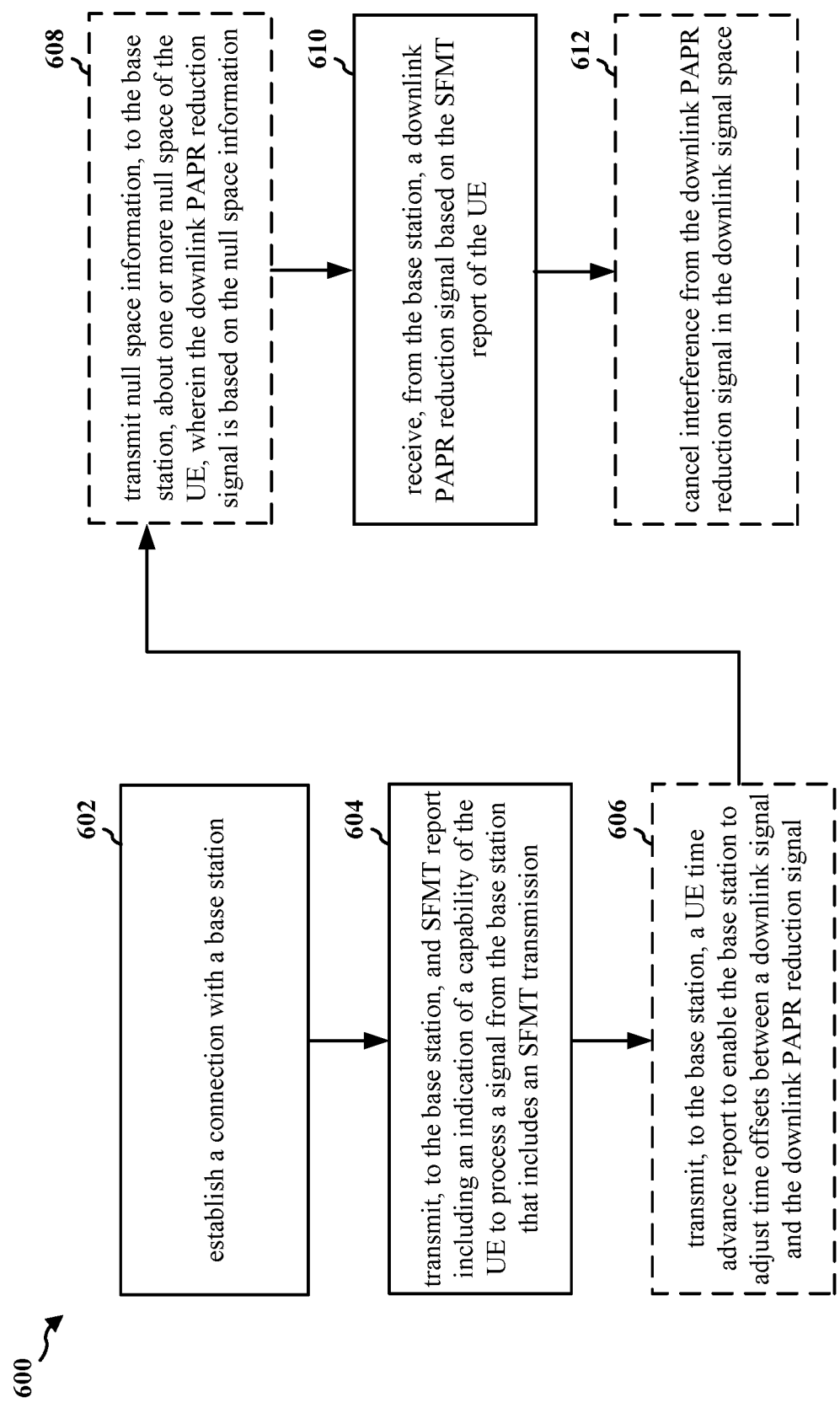
FIG. 6 is a flowchart of a method of wireless communication.

FIG. 6 is a flowchart 600 of a method of wireless communication. The method may be performed by a UE or a component of a UE (e.g., the UE 104, 402, 502; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to provide an SFMT report including an indication of capability to process an SFMT transmission in order to receive a PAPR reduction signal.

At 602, the UE may establish a connection with a base station. For example, 602 may be performed by connection component 740 of apparatus 702. The UE may establish the connection with the base station by transmitting a connection request to the base station.

At 604, the UE may transmit an SFMT report including an indication of a capability of the UE to process a signal from the base station that includes an SFMT transmission. For example, 604 may be performed by capability component 742 of apparatus 702. The UE may transmit the SFMT report including the indication of the capability of the UE to process the signal from the base station that includes the SFMT transmission to the base station. In some aspects, the indication may indicate that the UE may be capable of utilizing a lower resolution analog to digital converter (ADC). The UE may be configured to utilize a dynamic number of ADC bits which may allow the UE to utilize the lower resolution ADC. In some aspects, the capability may be based on the UE utilizing the dynamic number of ADC bits. In some aspects, the capability may be based on the UE utilizing a digital beamforming structure. In some aspects, the SFMT report may include information related to a downlink signal. For example, the SFMT report may include the downlink channel. In some aspects, the SFMT report may include information for the downlink signal and the downlink PAPR reduction signal.

In some aspects, for example at 606, the UE may transmit a UE time advance report. For example, 606 may be performed by time advance component 744 of apparatus 702. The UE may transmit the UE time advance report to the base station. The UE time advance report may enable the base station to adjust time offsets between a downlink signal and a downlink PAPR reduction signal. In some aspects, the downlink signal may be the downlink signal received by the UE during the connection establishment procedure with the base station. In some aspects, the UE time advance report may be transmitted via radio resource control (RRC) messaging, medium access control—control element (MAC-CE), or a channel state information (CSI) report.

In some aspects, for example at 608, the UE may transmit null space information. For example, 608 may be performed by null space component 746 of apparatus 702. The UE may transmit the null space information to the base station. The null space information may include information about one or more null spaces of the UE. In some instances, the null space information may include a UE null space report. The UE null space report may include an angle of arrival of a downlink signal from the base station. As the UE may move, rotate, etc. without the knowledge of the base station, the angle of arrival information may provide a frame of reference for the base station. The UE null space report may include an identification of one or more null spaces of the UE. For example, the one or more null spaces of the UE may be identified based on an angle or with other information identifying the location of the null space. The angle of a null space may be identified based on an antenna element of the UE. Each null space reported may include information as to which axis or axes the null space corresponds to in a coordinate system (e.g., Cartesian coordinates, polar coordinates, or any other possible coordinate system). For example, the UE may provide the angle and reference information to the base station. The number of null spaces reported may include a predefined maximum null space integer. The integer may be configured in an RRC message transmitted by the base station to the UE during a connection establishment procedure. In some instances, the UE null space report may comprise weights used for each antenna phase shifter to identify the one or more null spaces of the UE. Providing the weights used for each antenna phase shifter may provide the base station with the full beamforming configuration of the UE, such that the base station may calculate the one or more null spaces of the UE based on the weights used for each antenna phase shifter.

At 610, the UE may receive the downlink PAPR reduction signal. For example, 610 may be performed by signal component 748 of apparatus 702. The UE may receive the downlink PAPR reduction signal from the base station. The downlink PAPR reduction signal may be based on the SFMT report of the UE. In some aspects, the downlink PAPR reduction signal may be based on the null space information. In some aspects, the receiving of the downlink PAPR reduction signal may comprise receiving the downlink PAPR reduction signal in at least one null space of the UE.

In some aspects, for example at 612, the UE may cancel interference from the downlink PAPR reduction signal in a downlink signal space. For example, 612 may be performed by cancel component 750 of apparatus 702. In some aspects, the receiving of the downlink PAPR reduction signal may comprise receiving the downlink PAPR reduction signal in the downlink signal space.

Figure 7:
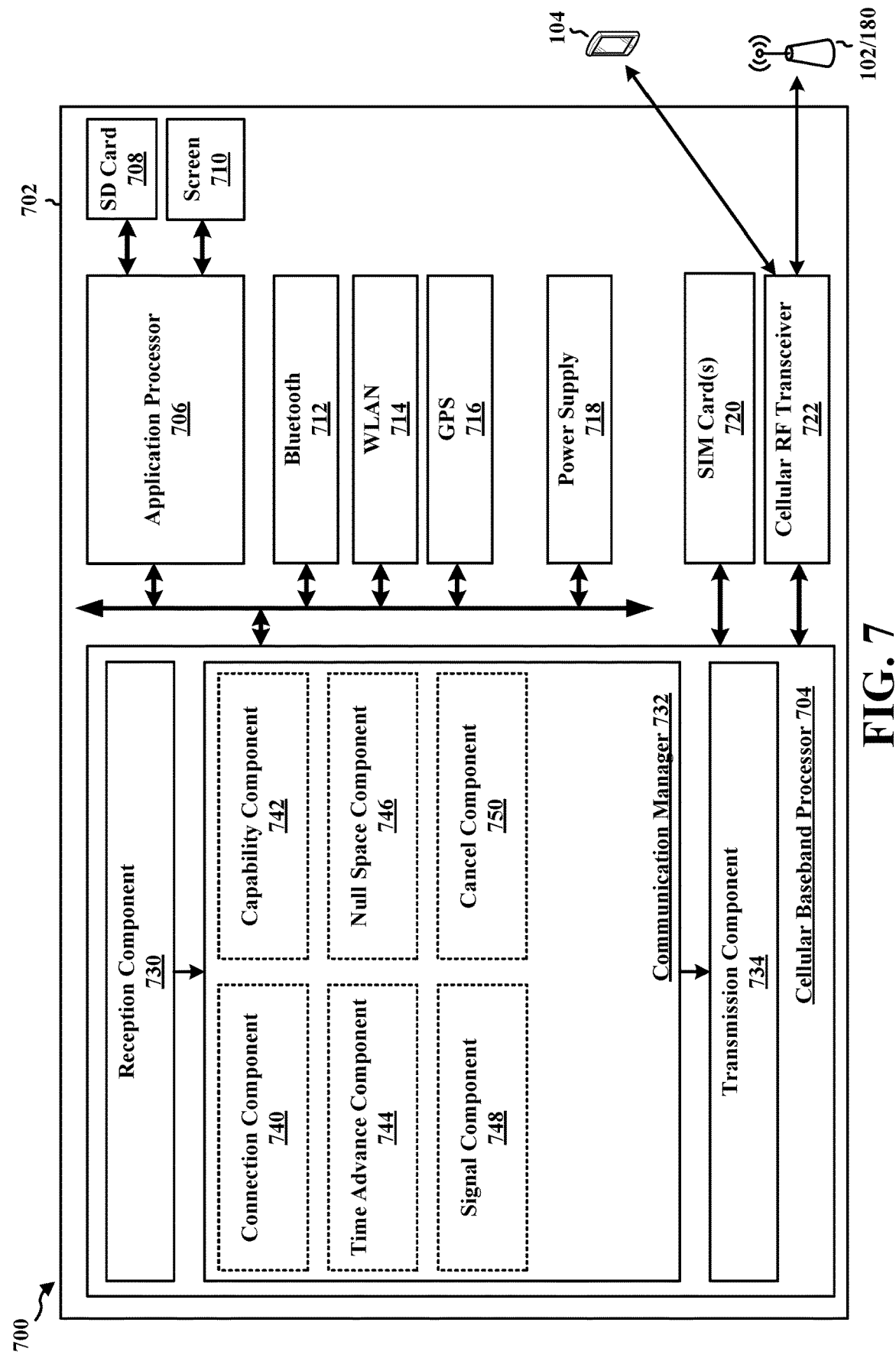
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the aforediscussed additional modules of the apparatus 702.

The communication manager 732 includes a connection component 740 that is configured to establish a connection with a base station, e.g., as described in connection with 602 of FIG. 6. The communication manager 732 further includes a capability component 742 that is configured to transmit an SFMT report including an indication of a capability of the UE to process a signal from the base station includes an SFMT transmission, e.g., as described in connection with 604 of FIG. 6. The communication manager 732 further includes a time advance component 744 that is configured to transmit a UE time advance report, e.g., as described in connection with 606 of FIG. 6. The communication manager 732 further includes a null space component 746 that is configured to transmit null space information, e.g., as described in connection with 608 of FIG. 6. The communication manager 732 further includes a signal component 748 that is configured to receive a downlink PAPR reduction signal, e.g., as described in connection with 610 of FIG. 6. The communication manager 732 further includes a cancel component 750 that is configured to cancel interference from the downlink PAPR reduction signal in a downlink signal space, e.g., as described in connection with 612 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for establishing a connection with a base station. The apparatus includes means for transmitting, to the base station, an SFMT report including an indication of a capability of the UE to process a signal form the base station that includes an SFMT transmission. The apparatus includes means for receiving, from the base station, a downlink PAPR reduction signal based on the SFMT report of the UE. The apparatus further includes means for transmitting, to the base station, a UE time advance report to enable the base station to adjust time offsets between a downlink signal and the downlink PAPR reduction signal. The apparatus further includes means for transmitting null space information, to the base station, about one or more null spaces of the UE. The downlink PAPR reduction signal is based on the null space information. The apparatus further includes means for canceling interference from the downlink PAPR reduction signal in the downlink signal space. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
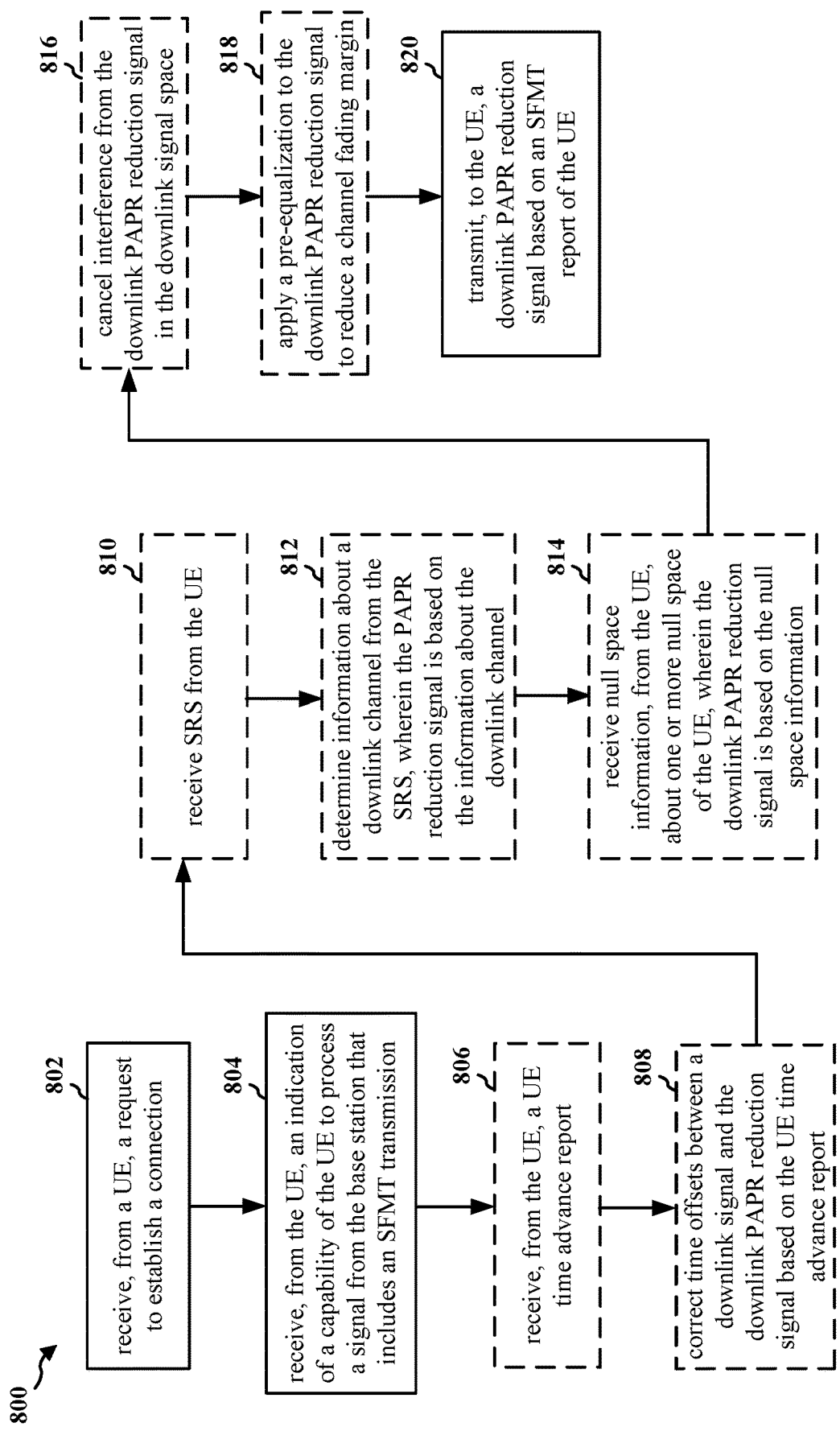
FIG. 8 is a flowchart of a method of wireless communication.

FIG. 8 is a flowchart 800 of a method of wireless communication. The method may be performed by a base station or a component of a base station (e.g., the base station 102/180, 404, 406, 504; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to reduce a UE PAPR due to a transmission of a PAPR reduction signal into a UE null space.

At 802, the base station may receive a request to establish a connection. For example, 802 may be performed by connection component 940 of apparatus 902. The base station may receive the request to establish the connection from a UE.

At 804, the base station may receive an SFMT report including an indication of a capability of the UE to process a signal from the base station that includes an SFMT transmission. For example, 804 may be performed by capability component 942 of apparatus 902. The base station may receive the SFMT report including the indication of the capability of the UE to process the signal from the base station that includes the SFMT transmission from the UE. In some aspects, the indication may indicate that the UE is capable of utilizing a lower resolution ADC. In some aspects, the capability may be based on the UE utilizing a digital beamforming architecture. In some aspects, the capability may be based on the UE utilizing a dynamic number of ADC bits. In some aspects, the capability may be based on the UE utilizing a digital beamforming structure. In some aspects, the SFMT report may include information related to a downlink signal. For example, the SFMT report may include the downlink channel. In some aspects, the SFMT report may include information for the downlink signal and the downlink PAPR reduction signal.

In some aspects, for example at 806, the base station may receive a UE time advance report. For example, 806 may be performed by time advance component 944 of apparatus 902. The base station may receive the UE time advance report from the UE. In some aspects, the UE time advance report may be transmitted via RRC message, MAC-CE, or CSI report. The UE time advance report may enable the base station to adjust time offsets between a downlink signal and a downlink PAPR reduction signal. In some aspects, the downlink signal may be the downlink signal received by the UE during the connection establishment procedure with the base station.

In some aspects, for example at 808, the base station may adjust time offsets between a downlink signal and a downlink PAPR reduction signal. For example, 808 may be performed by time advance component 944 of apparatus 902. The base station may adjust time offsets between the downlink signal and the downlink PAPR reduction signal based on the UE time advance report.

In some aspects, for example at 810, the base station may receive sounding reference signals (SRS) from the UE. For example, 810 may be performed by SRS component 946 of apparatus 902.

In some aspects, for example at 812, the base station may determine information about the downlink channel from the SRS. For example, 812 may be performed by SRS component 946 of apparatus 902. The PAPR reduction signal may be based on the information about the downlink channel within the SRS. In some aspects, the SFMT report may include information on the downlink signal and the downlink PAPR reduction signal.

In some aspects, for example at 814, the base station may receive null space information about one or more null spaces of the UE. For example, 814 may be performed by null space component 948 of apparatus 902. The base station may receive the null space information from the UE. The downlink PAPR reduction signal may be based on the null space information.

In some aspects, for example at 816, the base station may cancel interference from the downlink PAPR reduction signal in a downlink space. For example, 816 may be performed by cancel component 950 of apparatus 902. In some aspects, the transmitting the downlink PAPR reduction signal may comprise transmitting the downlink PAPR reduction signal in the downlink space.

In some aspects, for example at 818, the base station may apply a pre-equalization to the downlink PAPR reduction signal. For example, 818 may be performed by PAPR component 952 of apparatus 902. The base station may apply the pre-equalization to the downlink PAPR reduction signal to reduce a channel fading margin.

At 820, the base station may transmit the downlink PAPR reduction signal. For example, 820 may be performed by PAPR component 952 of apparatus 902. The base station may transmit the downlink PAPR reduction signal to the UE. The downlink PAPR reduction signal may be based on the SFMT report of the UE. In some aspects, the transmitting of the downlink PAPR reduction signal may comprise transmitting the downlink PAPR reduction signal in at least one null space of the UE. In some aspects, the base station may be configured to reduce the PAPR in the downlink PAPR reduction signal based on a modulation and coding scheme (MCS) utilized in the downlink signal.

Figure 9:
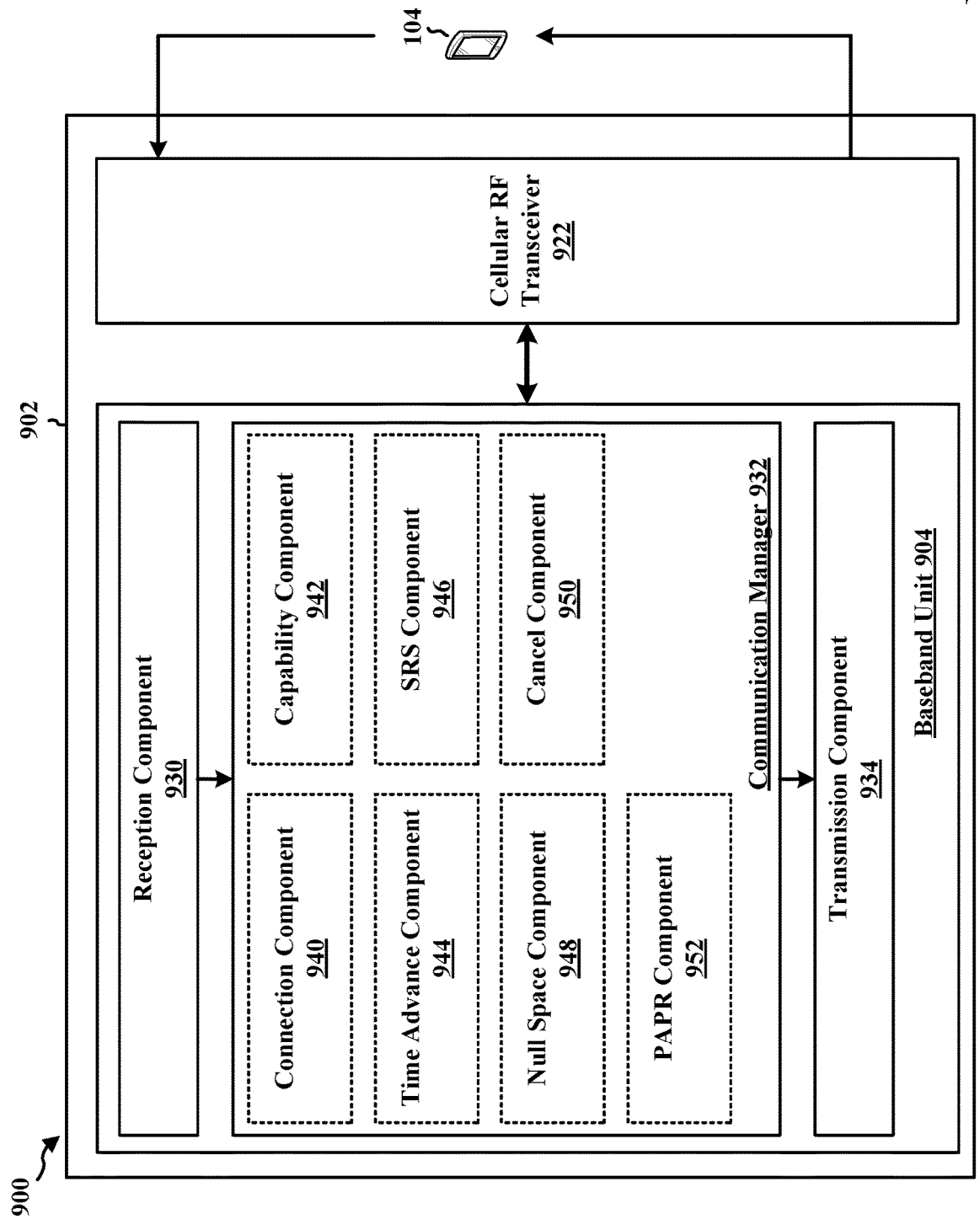
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a connection component 940 that may receive a request to establish a connection, e.g., as described in connection with 802 of FIG. 8. The communication manager 932 further includes a capability component 942 that may receive an SFMT report including an indication of a capability of the UE to process a signal from the base station that includes an SFMT transmission, e.g., as described in connection with 804 of FIG. 8. The communication manager 932 further includes a time advance component 944 that may receive a UE time advance report, e.g., as described in connection with 806 of FIG. 8. The time advance component 944 may be configured to adjust time offsets between a downlink signal and a downlink PAPR reduction signal, e.g., as described in connection with 808 of FIG. 8. The communication manager 932 further includes an SRS component 946 that may receive SRS from the UE, e.g., as described in connection with 810 of FIG. 8. The SRS component 948 may be configured to determine information about the downlink channel from the SRS, e.g., as described in connection with 812 of FIG. 8. The communication manager 932 further includes a null space component 948 that may receive null space information about one or more null spaces of the UE, e.g., as described in connection with 814 of FIG. 8. The communication manager 932 further includes a cancel component 950 that may cancel interference from the downlink PAPR reduction signal in a downlink space, e.g., as described in connection with 816 of FIG. 8. The communication manager 932 further includes a PAPR component 952 that may apply a pre-equalization to the downlink PAPR reduction signal, e.g., as described in connection with 818 of FIG. 8. The PAPR component 952 may be configured to transmit the downlink PAPR reduction signal, e.g., as described in connection with 820 of FIG. 8.

The apparatus may include additional components that perform each of the blocks of the algorithm in the aforementioned flowchart of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a request to establish a connection. The apparatus includes means for receiving, from the UE, an SFMT report including an indication of a capability of the UE to process a signal from the base station that includes an SFMT transmission. The apparatus includes means for transmitting, to the UE, a downlink PAPR reduction signal based on the SFMT report of the UE. The apparatus further includes means for receiving, from the UE, a UE time advance report. The apparatus further includes means for adjusting time offsets between a downlink signal and the downlink PAPR reduction signal based on the UE time advance report. The apparatus further includes means for receiving SRS from the UE. The apparatus further includes means for determining information about a downlink channel from the SRS, wherein the PAPR reduction signal is based on the information about the downlink channel. The apparatus further includes means for receiving null space information, from the UE, about one or more null space of the UE. The downlink PAPR reduction signal is based on the null space information. The apparatus further includes means for cancelling interference from the downlink PAPR reduction signal in the downlink signal space. The apparatus further includes means for applying a pre-equalization to the downlink PAPR reduction signal to reduce a channel fading margin. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising establishing a connection with a base station; transmitting, to the base station, an SFMT report including an indication of a capability of the UE to process a signal from the base station that includes an SFMT transmission; and receiving, from the base station, a downlink PAPR reduction signal based on the SFMT report of the UE.

In Aspect 2, the method of Aspect 1 further includes that the indication indicates that the UE is capable of utilizing a lower resolution ADC.

In Aspect 3, the method of Aspect 1 or 2 further includes that the capability is based on the UE utilizing a digital beamforming architecture.

In Aspect 4, the method of any of Aspects 1-3 further includes that the capability is based on the UE utilizing a dynamic number of ADC bits.

In Aspect 5, the method of any of Aspects 1-4 further includes transmitting, to the base station, a UE time advance report to enable the base station to adjust time offsets between a downlink signal and the downlink PAPR reduction signal.

In Aspect 6, the method of any of Aspects 1-5 further includes that the UE time advance report is transmitted via RRC message, MAC-CE, or CSI report.

In Aspect 7, the method of any of Aspects 1-6 further includes that the SFMT report includes information related to a downlink signal.

In Aspect 8, the method of any of Aspects 1-7 further includes that the SFMT report includes information for the downlink signal and the downlink PAPR reduction signal.

In Aspect 9, the method of any of Aspects 1-8 further includes that the receiving the downlink PAPR reduction signal comprises receiving the downlink PAPR reduction signal in at least one null space of the UE.

In Aspect 10, the method of any of Aspects 1-9 further includes transmitting null space information, to the base station, about one or more null spaces of the UE, wherein the downlink PAPR reduction signal is based on the null space information.

In Aspect 11, the method of any of Aspects 1-10 further includes that the receiving the downlink PAPR reduction signal comprises receiving the downlink PAPR reduction signal in a downlink signal space, further including canceling interference from the downlink PAPR reduction signal in the downlink signal space.

Aspect 12 is a device including one or more processors and one or more memories in electronic communication with the one or more processors storing instructions executable by the one or more processors to cause the system or apparatus to implement a method as in any of Aspects 1-11.

Aspect 13 is a system or apparatus including means for implementing a method or realizing an apparatus as in any of Aspects 1-11.

Aspect 14 is a non-transitory computer readable medium storing instructions executable by one or more processors to cause the one or more processors to implement a method as in any of Aspects 1-11.

Aspect 15 is a method of wireless communication at a base station comprising receiving, from a UE, a request to establish a connection; receiving, from the UE, an SFMT report including an indication of a capability of the UE to process a signal from the base station that includes an SFMT transmission; and transmitting, to the UE, a downlink PAPR reduction signal based on the SFMT report of the UE.

In Aspect 16, the method of Aspect 15 further includes that the indication indicates that the UE is capable of utilizing a lower resolution ADC.

In Aspect 17, the method of Aspect 15 or 16 further includes that the capability is based on the UE utilizing a digital beamforming architecture.

In Aspect 18, the method of any of Aspects 15-17 further includes that the capability is based on the UE utilizing a dynamic number of ADC bits.

In Aspect 19, the method of any of Aspects 15-18 further includes receiving, from the UE, a UE time advance report; and adjusting time offsets between a downlink signal and the downlink PAPR reduction signal based on the UE time advance report.

In Aspect 20, the method of any of Aspects 15-19 further includes that the UE time advance report is transmitted via RRC message, MAC-CE, or CSI report.

In Aspect 21, the method of any of Aspects 15-20 further includes that the SFMT report includes information related to a downlink signal.

In Aspect 22, the method of any of Aspects 15-21 further includes receiving sounding reference signals (SRS) from the UE; and determining information about a downlink channel from the SRS, wherein the PAPR reduction signal is based on the information about the downlink channel.

In Aspect 23, the method of any of Aspects 15-22 further includes that the SFMT report includes information related to the downlink signal and the downlink PAPR reduction signal.

In Aspect 24, the method of any of Aspects 15-23 further includes that the transmitting the downlink PAPR reduction signal comprises transmitting the downlink PAPR reduction signal in at least one null space of the UE.

In Aspect 25, the method of any of Aspects 15-24 further includes receiving null space information, from the UE, about one or more null space of the UE, wherein the downlink PAPR reduction signal is based on the null space information.

In Aspect 26, the method of any of Aspects 15-25 further includes that the transmitting the downlink PAPR reduction signal comprises transmitting the downlink PAPR reduction signal in a downlink signal space, further including cancelling interference from the downlink PAPR reduction signal in the downlink signal space.

In Aspect 27, the method of any of Aspects 15-26 further includes applying a pre-equalization to the downlink PAPR reduction signal to reduce a channel fading margin.

In Aspect 28, the method of any of Aspects 15-27 further includes that the base station is configured to reduce the PAPR in the downlink PAPR reduction signal based on a MCS utilized in a downlink signal.

Aspect 29 is a device including one or more processors and one or more memories in electronic communication with the one or more processors storing instructions executable by the one or more processors to cause the system or apparatus to implement a method as in any of Aspects 15-28.

Aspect 30 is a system or apparatus including means for implementing a method or realizing an apparatus as in any of Aspects 15-28.

Aspect 31 is a non-transitory computer readable medium storing instructions executable by one or more processors to cause the one or more processors to implement a method as in any of Aspects 15-28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

establishing a connection with a base station;

transmitting, to the base station, a space frequency multiple transmission reception point (SFMT) report including an indication of a capability of the UE to process a signal from the base station that includes an SFMT transmission, wherein the indication indicates that the UE is capable of utilizing a lower resolution analog to digital converter (ADC); and receiving, from the base station, a downlink peak to average power ratio (PAPR) reduction signal based on the SFMT report of the UE.

2. The method of claim 1, wherein the capability is based on the UE utilizing a digital beamforming architecture.

3. The method of claim 1, wherein the SFMT report includes information related to a downlink signal.

4. The method of claim 3, wherein the SFMT report includes information for the downlink signal and the downlink PAPR reduction signal.

5. The method of claim 1, wherein the receiving the downlink PAPR reduction signal comprises receiving the downlink PAPR reduction signal in at least one null space of the UE.

6. The method of claim 5, further comprising:

transmitting null space information, to the base station, about one or more null space of the UE, wherein the downlink PAPR reduction signal is based on the null space information.

7. A method of wireless communication at a user equipment (UE), comprising:

establishing a connection with a base station;

transmitting, to the base station, a space frequency multiple transmission reception point (SFMT) report including an indication of a capability of the UE to process a signal from the base station that includes an SFMT transmission, wherein the capability is based on the UE utilizing a dynamic number of analog to digital converter (ADC) bits; and receiving, from the base station, a downlink peak to average power ratio (PAPR) reduction signal based on the SFMT report of the UE.

8. A method of wireless communication at a user equipment (UE), comprising:

establishing a connection with a base station;

transmitting, to the base station, a space frequency multiple transmission reception point (SFMT) report including an indication of a capability of the UE to process a signal from the base station that includes an SFMT transmission;

transmitting, to the base station, a UE time advance report to enable the base station to adjust time offsets between a downlink signal and the downlink PAPR reduction signal; and receiving, from the base station, a downlink peak to average power ratio (PAPR) reduction signal based on the SFMT report of the UE.

9. The method of claim 8, wherein the UE time advance report is transmitted via radio resource control (RRC) message, medium access control-control element (MAC-CE), or channel state information (CSI) report.

10. A method of wireless communication at a user equipment (UE), comprising:
 establishing a connection with a base station;
 transmitting, to the base station, a space frequency multiple transmission reception point (SFMT) report including an indication of a capability of the UE to process a signal from the base station that includes an SFMT transmission;
 receiving, from the base station, a downlink peak to average power ratio (PAPR) reduction signal based on the SFMT report of the UE, wherein the receiving the downlink PAPR reduction signal comprises receiving the downlink PAPR reduction signal in a downlink signal space; and
 canceling interference from the downlink PAPR reduction signal in the downlink signal space.

11. An apparatus for wireless communication at a user equipment (UE), comprising:
 a memory; and
 at least one processor coupled to the memory and configured to:
  establish a connection with a base station;
  transmit, to the base station, a space frequency multiple transmission reception point (SFMT) report including an indication of a capability of the UE to process a signal from the base station that includes an SFMT transmission, wherein the indication indicates that the UE is capable of utilizing a lower resolution analog to digital converter (ADC); and
  receive, from the base station, a downlink peak to average power ratio (PAPR) reduction signal based on the SFMT report of the UE.

12. The apparatus of claim 11, wherein the SFMT report includes information related to a downlink signal.

13. The apparatus of claim 11, wherein the at least one processor configured to:
 transmit null space information, to the base station, about one or more null space of the UE, wherein the downlink PAPR reduction signal is based on the null space information.

14. An apparatus for wireless communication at a user equipment (UE), comprising:
 a memory; and
 at least one processor coupled to the memory and configured to:
  establish a connection with a base station;
  transmit, to the base station, a space frequency multiple transmission reception point (SFMT) report including an indication of a capability of the UE to process a signal from the base station that includes an SFMT transmission;
  transmit, to the base station, a UE time advance report to enable the base station to adjust time offsets between a downlink signal and the downlink PAPR reduction signal; and
  receive, from the base station, a downlink peak to average power ratio (PAPR) reduction signal based on the SFMT report of the UE.

15. A method of wireless communication at a base station, comprising:
 receiving, from a user equipment (UE), a request to establish a connection;
 receiving, from the UE, a space frequency multiple transmission reception point (SFMT) report including an indication of a capability of the UE to process a signal from the base station that includes an SFMT transmission, wherein the indication indicates that the UE is capable of utilizing a lower resolution analog to digital converter (ADC); and
 transmitting, to the UE, a downlink peak to average power ratio (PAPR) reduction signal based on the SFMT report of the UE.

16. The method of claim 15, wherein the capability is based on the UE utilizing a digital beamforming architecture.

17. The method of claim 15, wherein the SFMT report includes information related to a downlink signal.

18. The method of claim 15, further comprising:
 receiving sounding reference signals (SRS) from the UE; and
 determining information about a downlink channel from the SRS, wherein the PAPR reduction signal is based on the information about the downlink channel.

19. The method of claim 18, wherein the SFMT report includes information related to the downlink signal and the downlink PAPR reduction signal.

20. The method of claim 15, wherein the transmitting the downlink PAPR reduction signal comprises transmitting the downlink PAPR reduction signal in at least one null space of the UE.

21. The method of claim 20, further comprising:
 receiving null space information, from the UE, about one or more null space of the UE, wherein the downlink PAPR reduction signal is based on the null space information.

22. A method of wireless communication at a base station, comprising:
 receiving, from a user equipment (UE), a request to establish a connection;
 receiving, from the UE, a space frequency multiple transmission reception point (SFMT) report including an indication of a capability of the UE to process a signal from the base station that includes an SFMT transmission, wherein the capability is based on the UE utilizing a dynamic number of analog to digital converter (ADC) bits; and
 transmitting, to the UE, a downlink peak to average power ratio (PAPR) reduction signal based on the SFMT report of the UE.

23. A method of wireless communication at a base station, comprising:
 receiving, from a user equipment (UE), a request to establish a connection;
 receiving, from the UE, a space frequency multiple transmission reception point (SFMT) report including an indication of a capability of the UE to process a signal from the base station that includes an SFMT transmission;
 receiving, from the UE, a UE time advance report;
 adjusting time offsets between a downlink signal and the downlink PAPR reduction signal based on the UE time advance report; and
 transmitting, to the UE, a downlink peak to average power ratio (PAPR) reduction signal based on the SFMT report of the UE.

24. The method of claim 23, wherein the UE time advance report is transmitted via radio resource control (RRC) message, medium access control-control element (MAC-CE), or channel state information (CSI) report.

25. A method of wireless communication at a base station, comprising:
 receiving, from a user equipment (UE), a request to establish a connection;

receiving, from the UE, a space frequency multiple transmission reception point (SFMT) report including an indication of a capability of the UE to process a signal from the base station that includes an SFMT transmission;

cancelling interference from a downlink peak to average power ratio (PAPR) reduction signal in a downlink signal space; and transmitting, to the UE, the downlink PAPR reduction signal based on the SFMT report of the UE, wherein the transmitting the downlink PAPR reduction signal comprises transmitting the downlink PAPR reduction signal in the downlink signal space.

26. A method of wireless communication at a base station, comprising:

receiving, from a user equipment (UE), a request to establish a connection;

receiving, from the UE, a space frequency multiple transmission reception point (SFMT) report including an indication of a capability of the UE to process a signal from the base station that includes an SFMT transmission;

applying a pre-equalization to a downlink peak to average power ratio (PAPR) reduction signal to reduce a channel fading margin; and transmitting, to the UE, the downlink PAPR reduction signal based on the SFMT report of the UE.

27. A method of wireless communication at a base station, comprising:

receiving, from a user equipment (UE), a request to establish a connection;

receiving, from the UE, a space frequency multiple transmission reception point (SFMT) report including an indication of a capability of the UE to process a signal from the base station that includes an SFMT transmission; and transmitting, to the UE, a downlink peak to average power ratio (PAPR) reduction signal based on the SFMT report of the UE, wherein the base station is configured to reduce the PAPR in the downlink PAPR reduction signal based on a modulation and coding scheme (MCS) utilized in a downlink signal.

28. An apparatus for wireless communication at a base station, comprising:

a memory; and at least one processor coupled to the memory and configured to:

receive, from a user equipment (UE), a request to establish a connection;

receive, from the UE, a space frequency multiple transmission reception point (SFMT) report including an indication of a capability of the UE to process a signal from the base station that includes an SFMT transmission, wherein the indication indicates that the UE is capable of utilizing a lower resolution analog to digital converter (ADC); and transmit, to the UE, a downlink peak to average power ratio (PAPR) reduction signal based on the SFMT report of the UE.

* * * * *